(12) United States Patent
Park et al.

(10) Patent No.: US 12,384,685 B2
(45) Date of Patent: Aug. 12, 2025

(54) METHOD FOR MANUFACTURING AEROGEL BLANKET

(71) Applicant: LG CHEM, LTD., Seoul (KR)

(72) Inventors: Sang Woo Park, Daejeon (KR); Se Won Baek, Daejeon (KR)

(73) Assignee: LG CHEM, LTD., Seoul (KR)

( * ) Notice: Subject to any disclaimer, the term of this patent is extended or adjusted under 35 U.S.C. 154(b) by 337 days.

(21) Appl. No.: 17/920,097

(22) PCT Filed: Oct. 29, 2021

(86) PCT No.: PCT/KR2021/015480
§ 371 (c)(1),
(2) Date: Oct. 20, 2022

(87) PCT Pub. No.: WO2022/098008
PCT Pub. Date: May 12, 2022

(65) Prior Publication Data
US 2023/0174381 A1    Jun. 8, 2023

(30) Foreign Application Priority Data

Nov. 9, 2020   (KR) .......................... 10-2020-0148448

(51) Int. Cl.
*C01B 33/158*   (2006.01)
*B01D 11/02*   (2006.01)
(Continued)

(52) U.S. Cl.
CPC ...... *C01B 33/1585* (2013.01); *B01D 11/0203* (2013.01); *B01J 3/008* (2013.01); *C01B 33/159* (2013.01)

(58) Field of Classification Search
CPC .............. C01B 33/1585; C01B 33/159; B01D 11/0203; B01J 3/008; B01J 13/0091; Y02E 60/13; Y02P 20/54
See application file for complete search history.

(56) References Cited

U.S. PATENT DOCUMENTS

2004/0087670 A1* 5/2004 Lee ...................... B01J 13/0091
516/99
2007/0272902 A1   11/2007 Evans et al.
(Continued)

FOREIGN PATENT DOCUMENTS

| CN | 104496402 A | 4/2015 |
| CN | 105664809 A | 6/2016 |

(Continued)

OTHER PUBLICATIONS

Amaral-Labat et al. (Effect of supercritical drying conditions in ethanol on the structural and textural properties of silica aerogels, Journal of Porous Materials, 2007) (Year: 2007).*
(Continued)

*Primary Examiner* — Sally A Merkling
*Assistant Examiner* — Logan Edward Laclair
(74) *Attorney, Agent, or Firm* — Morgan, Lewis & Bockius LLP

(57) ABSTRACT

The present disclosure relates to a method for manufacturing an aerogel blanket. The method includes preparing a wet gel blanket including an organic solvent, introducing the wet gel blanket into a supercritical extraction device, and drying the wet gel blanket using supercritical carbon dioxide, decompressing the pressure of the supercritical extraction device, and supplying gaseous carbon dioxide to the decompressed supercritical extraction device to dry the wet gel blanket.

14 Claims, 1 Drawing Sheet

(51) Int. Cl.
*B01J 3/00* (2006.01)
*C01B 33/159* (2006.01)

(56) References Cited

U.S. PATENT DOCUMENTS

| | | |
|---|---|---|
| 2009/0029147 A1 | 1/2009 | Tang et al. |
| 2016/0046867 A1 | 2/2016 | Evans et al. |
| 2017/0081494 A1 | 3/2017 | Fricke et al. |
| 2018/0072578 A1 | 3/2018 | Kim et al. |
| 2018/0099873 A1 | 4/2018 | Kim et al. |
| 2018/0134565 A1 | 5/2018 | Hindelang et al. |
| 2018/0179073 A1* | 6/2018 | Oh .............. C01B 33/1585 |
| 2018/0258249 A1 | 9/2018 | Fricke et al. |
| 2019/0225498 A1 | 7/2019 | Ruiz et al. |
| 2020/0061569 A1 | 2/2020 | Evans et al. |
| 2020/0115244 A1 | 4/2020 | Choi et al. |
| 2020/0331766 A1 | 10/2020 | Oh et al. |
| 2021/0079300 A1 | 3/2021 | Evans et al. |
| 2021/0147243 A1 | 5/2021 | Kim et al. |
| 2021/0198578 A1 | 7/2021 | Evans et al. |
| 2021/0206923 A1 | 7/2021 | Lee et al. |
| 2021/0207032 A1 | 7/2021 | Evans et al. |
| 2021/0230006 A1 | 7/2021 | Oh et al. |

FOREIGN PATENT DOCUMENTS

| | | | |
|---|---|---|---|
| CN | 108636304 A | | 10/2018 |
| CN | 110553470 A | * | 12/2019 ......... C01B 33/1585 |
| CN | 111099876 A | | 5/2020 |
| EP | 3581552 A1 | | 12/2019 |
| JP | 2019-524611 A | | 9/2019 |
| JP | 2020-063187 A | | 4/2020 |
| JP | 2020-73443 A | | 5/2020 |
| JP | 2020-529959 A | | 10/2020 |
| KR | 10-2007-0114668 A | | 12/2007 |
| KR | 10-2012-0070948 A | | 7/2012 |
| KR | 10-2017-0008823 A | | 1/2017 |
| KR | 10-2017-0086830 A | | 7/2017 |
| KR | 10-2017-0141780 A | | 12/2017 |
| KR | 10-2019-0025935 A | | 3/2019 |
| KR | 10-2020-0073161 A | | 6/2020 |
| KR | 10-2020-0077263 A | | 6/2020 |
| WO | 2007/146945 A2 | | 12/2007 |
| WO | 2017/155311 A1 | | 9/2017 |
| WO | 2018/056626 A1 | | 3/2018 |
| WO | WO-2019093868 A2 | * | 5/2019 .............. B01J 13/00 |
| WO | 2020/111765 A1 | | 6/2020 |

OTHER PUBLICATIONS

Singh et al. (Analysis of modes of drug loading in silica aerogels from supercritical CO2 solutions, The Journal of Supercritical Fluids, 2019) (Year: 2019).*
Smirnova et al. (Adsorption of Drugs on Silica Aerogels, Langmuir, 2003) (Year: 2003).*
Machine translation of CN110553470 (Year: 2019).*
Office Action issued on Nov. 9, 2023 for the corresponding Korean patent application No. 10-2020-0148448.
International Search Report (with partial translation) and Written Opinion dated Feb. 8, 2022, for corresponding International Patent Application No. PCT/KR2021/015480.
Kudra, et al., "Gaseous Carbon Dioxide as the Heat and Mass Transfer Medium in Drying", 2007, Drying Technology: An International Journal, vol. 25, 9 pages total.
Office Action issued Jul. 27, 2023 for counterpart Chinese Patent Application No. 202180029503.X.
Office Action issued Oct. 2, 2023 for counterpart Japanese Patent Application No. 2022-564803.
Office Action issued Oct. 5, 2023 for counterpart European Patent Application No. 21889473.1.

* cited by examiner

METHOD FOR MANUFACTURING AEROGEL BLANKET

CROSS-REFERENCE TO RELATED APPLICATIONS

This application claims the benefit of Korean Patent Application No. 10-2020-0148448, filed on Nov. 9, 2020, in the Korean Intellectual Property Office, the disclosure of which is incorporated herein in its entirety by reference.

TECHNICAL FIELD

Technical Field

The present invention relates to a method for manufacturing an aerogel blanket, more particularly, to a method for manufacturing an aerogel blanket which improves the drying efficiency of a wet gel blanket.

Background Art

An aerogel is a super-porous, high specific surface area ($\geq 500$ m$^2$/g) material having a porosity of about 90.0% to 99.9% and a pore size in the range of 1 nm to 100 nm, and is a material having excellent properties of ultra-light weight, super thermal insulation, ultra-low dielectric, and the like. Therefore, research on the development of aerogel materials as well as research on the practical use thereof as transparent insulation materials, environmentally friendly high-temperature insulation materials, ultra-low dielectric thin films for highly integrated devices, catalysts and catalyst carriers, electrodes for super capacitors, and electrode materials for seawater desalination have been actively conducted.

The biggest advantages of the aerogel are that the aerogel has super-insulation properties exhibiting a thermal conductivity of 0.300 W/m·K or less, which is lower than that of a conventional organic thermal insulation material such as Styrofoam, and that fire vulnerability and the generation of harmful gases in case of occurrence of fire which are fatal weaknesses of the organic thermal insulation material can be solved.

In general, the aerogel is manufactured by preparing a hydrogel from a silica precursor such as water glass and an alkoxysilane group (TEOS, TMOS, MTMS, and the like) and removing a liquid component inside the hydrogel without destroying a microstructure.

Particularly, a hydrophobic silica aerogel blanket in which a hydrophobic silica aerogel is formed in a fiber is a functional thermal insulation material which prevents corrosion by moisture, and is widely used in construction or industrial fields. In general, such an aerogel blanket is manufactured through steps of silica sol solution preparation, gelation, aging, surface modification, and drying.

However, the drying step of the typical manufacturing method as described above is performed by supercritical drying, which is an expensive process, and there is a problem in that an organic solvent inside the hydrophobic silica aerogel blanket cannot be removed only by the supercritical drying. Therefore, an aerogel blanket which has been subjected to only the supercritical drying has an organic solvent remaining thereinside, and the remaining organic solvent as described above causes moisture absorption when the aerogel blanket is used and exposed to moisture, which results in degrading the water repellency performance of the aerogel blanket, causing the thermal conductivity of the aerogel blanket to increase, and causing a problem in that the durability of the aerogel blanket is degraded.

Accordingly, in order to solve the above problems, a method for additionally performing an atmospheric pressure drying process after the supercritical drying of an aerogel blanket has been proposed. The atmospheric pressure drying process which is additionally performed after the supercritical drying is performed as a hot air drying process using air having a temperature of 150° C. to 180° C. under atmospheric pressure. However, the atmospheric pressure drying process additionally performed causes the total drying time to increase when the aerogel blanket is manufactured, and there are problems in that thermal energy is essentially consumed to generate the hot air, and an exhaust gas treatment facility is essentially required to process an exhaust gas generated from the atmospheric pressure drying process.

PRIOR ART DOCUMENT

Patent Document (Patent Document 1) KR10-2012-0070948A

DISCLOSURE OF THE INVENTION

Technical Problem

An aspect of the present invention provides a method for manufacturing an aerogel blanket, the method capable of minimizing the amount of residual organic solvent in an aerogel blanket without performing a separate atmospheric pressure drying process after a supercritical drying process.

Technical Solution

According to an aspect of the present invention, there is provided a method for manufacturing an aerogel blanket.

(1) The present invention provides a method for manufacturing an aerogel blanket, the method including preparing a wet gel blanket including an organic solvent (S10), introducing the wet gel blanket into a supercritical extraction device, and drying the wet gel blanket using supercritical carbon dioxide (S20), decompressing the pressure of the supercritical extraction device (S30), and supplying gaseous carbon dioxide to the decompressed supercritical extraction device to dry the wet gel blanket.

(2) In the (1), the present invention provides a method for manufacturing an aerogel blanket, wherein the organic solvent is an alcohol.

(3) In the (1) or (2), the present invention provides a method for manufacturing an aerogel blanket, wherein the wet gel blanket prepared in the step (S10) is a silica wet gel blanket.

(4) In any one of the (1) to (3), the present invention provides a method for manufacturing an aerogel blanket, wherein the step (S10) includes preparing a precursor composition including a silica precursor and an organic solvent (S1), preparing a catalyst composition including an organic solvent, a catalyst, and a surface modifier (S2), introducing the precursor composition and the catalyst composition into an impregnation tank, and allowing a base material for a blanket to pass through the impregnation tank to prepare a wet gel blanket (S3), and adding a surface modification solution including a surface modifier to the wet gel blanket and aging the mixture (S4).

(5) In the (4), the present invention provides a method for manufacturing an aerogel blanket, wherein the wet gel blanket prepared in the step (S3) is a wet gel blanket in which the precursor composition and the catalyst composition are impregnated and gelled in the base material for a blanket when the base material for a blanket passes through the impregnation tank.

(6) In any one of the (1) to (5), the present invention provides a method for manufacturing an aerogel blanket, wherein the drying of the step (S20) is to dry the wet gel blanket, and at the same time, extract the organic solvent.

(7) In the (6), the present invention provides a method for manufacturing an aerogel blanket, wherein the organic solvent extracted in the step (S20) is recirculated to the step (S10) of preparing a wet gel blanket.

(8) In any one of the (1) to (7), the present invention provides a method for manufacturing an aerogel blanket, wherein the decompression of the step (S30) is performed such that the pressure of the supercritical extraction device is to be 10 bar to 70 bar.

(9) In any one of the (1) to (8), the present invention provides a method for manufacturing an aerogel blanket, wherein the decompression of the step (S30) includes performing decompression such that the pressure of the supercritical extraction device is to be 50 bar to 70 bar (S31), and performing decompression such that the pressure of the supercritical extraction device is to be 10 bar to 50 bar (S32)

(10) In any one of the (1) to (9), the present invention provides a method for manufacturing an aerogel blanket, wherein the pressure at which the gaseous carbon dioxide is supplied in the step (S40) is 10 bar to 70 bar.

(11) In any one of the (1) to (10), the present invention provides a method for manufacturing an aerogel blanket, wherein the temperature at which the gaseous carbon dioxide is supplied in the step (S40) is 60° C. or higher.

(12) In any one of the (1) to (11), the present invention provides a method for manufacturing an aerogel blanket, wherein the drying of the step (S40) is to dry the wet gel blanket, and at the same time, extract the organic solvent.

(13) In the (12), the present invention provides a method for manufacturing an aerogel blanket, wherein the organic solvent extracted in the step (S40) is recirculated to the step (S10) of preparing a wet gel blanket.

(14) In any one of the (1) to (13), the present invention provides a method for manufacturing an aerogel blanket, wherein the method for manufacturing an aerogel blanket further includes decompressing the pressure of the supercritical extraction device to atmospheric pressure (S50) after the drying of the step (S40).

(15) In any one of the (1) to (14), the present invention provides a method for manufacturing an aerogel blanket, wherein the recovery rate of an organic solvent is 98.00 wt % or greater.

Advantageous Effects

According to an aerogel blanket manufacturing method according to the present invention, the amount of residual organic solvent of an aerogel blanket may minimized after drying, so that there is an effect of preventing the degradation of physical properties caused by the residual organic solvent.

In addition, according to an aerogel blanket manufacturing method according to the present invention, an organic solvent may be recovered to the maximum, so that there is an effect of improving productivity by reducing the manufacturing cost of the aerogel blanket.

In addition, according to an aerogel blanket manufacturing method according to the present invention, an atmospheric pressure drying process may be omitted, so that there is an effect of shortening the total drying time.

In addition, according to an aerogel blanket manufacturing method according to the present invention, an atmospheric pressure drying process may be omitted, so that there is an effect of improving productivity by reducing thermal energy consumption for atmospheric pressure drying.

In addition, according to an aerogel blanket manufacturing method according to the present invention, an atmospheric pressure drying process may be omitted, so that an exhaust gas treatment facility is not required to process an exhaust gas generated from the atmospheric pressure drying process.

MODE FOR CARRYING OUT THE INVENTION

Figure 1:
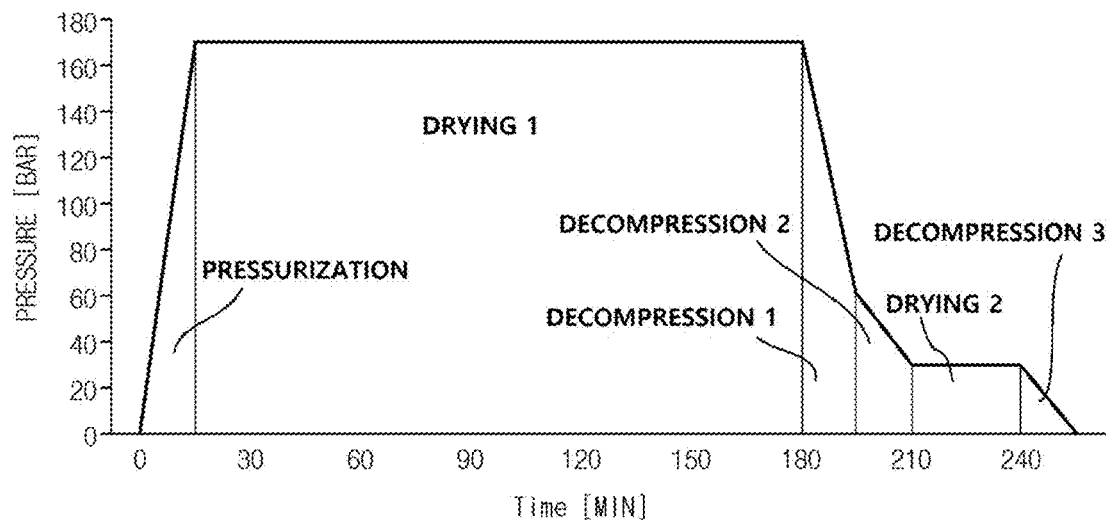
FIG. 1 is a graph showing changes in pressure in a supercritical extraction device for each drying time according to Examples 1 to 3 of the present invention.
Figure 2:
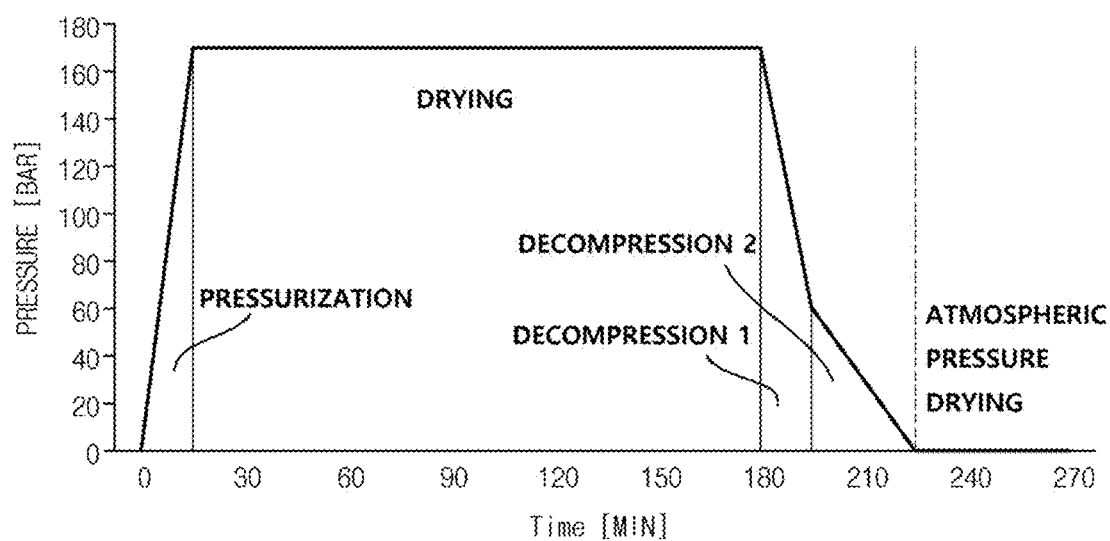
FIG. 2 is a graph showing changes in pressure in a supercritical extraction device for each drying time according to Comparative Example 1 to 3 of the present invention.

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The present invention provides a method for manufacturing an aerogel blanket which improves the drying efficiency of a wet gel blanket.

According to an embodiment of the present invention, the method for manufacturing an aerogel blanket may include preparing a wet gel blanket including an organic solvent (S10), introducing the wet gel blanket into a supercritical extraction device, and drying the wet gel blanket using supercritical carbon dioxide (S20), decompressing the pressure of the supercritical extraction device (S30), and supplying gaseous carbon dioxide to the decompressed supercritical extraction device to dry the wet gel blanket (S40).

According to an embodiment of the present invention, the step (S10) of preparing a wet gel blanket including an organic solvent is a step of preparing a wet gel blanket for manufacturing an aerogel blanket obtained by subsequent drying processes of the steps (S20 to S40), and may be a step of preparing a wet gel blanket including an organic solvent included in a sol solution, a surface modification solution, and the like.

According to an embodiment of the present invention, the organic solvent may be an organic solvent which may be used when preparing a wet gel blanket, and may be a polar organic solvent as a specific example, and may be an alcohol as a more specific example. Here, the alcohol may be one or more selected from the group consisting of a monohydric alcohol such as methanol, ethanol, isopropanol, and butanol, and a polyhydric alcohol such as glycerol, ethylene glycol, propylene glycol, diethylene glycol, dipropylene glycol, and sorbitol, and as a specific example, the alcohol may be one or more selected from the group consisting of monohydric alcohols having 1 to 6 carbon atoms, such as methanol, ethanol, isopropanol and, butanol, in consideration of the miscibility with water and with a wet gel to be prepared later.

According to an embodiment of the present invention, the wet gel blanket prepared in the step (S10) may be a silica wet gel blanket prepared from a silica precursor, and accordingly, an aerogel blanket obtained by subsequent drying processes of the steps (S20 to S40) may be a silica aerogel blanket.

According to an embodiment of the present invention, the step (S10) may be performed by including a silica sol solution preparation step, a gelation step, an aging step, and a surface modification step. As a specific example, the step (S10) may include preparing a precursor composition including a silica precursor and an organic solvent (S1), preparing a catalyst composition including an organic solvent, a catalyst, and a surface modifier (S2), introducing the precursor composition and the catalyst composition into an impregnation tank, and allowing a base material for a blanket to pass through the impregnation tank to prepare a wet gel blanket (S3), and adding a surface modification solution including a surface modifier to the wet gel blanket and aging the mixture (S4).

According to an embodiment of the present invention, the step (S1) is a step of preparing a precursor composition for manufacturing a wet gel and an aerogel, and may be performed by mixing a silica precursor with an organic solvent.

According to an embodiment of the present invention, the silica precursor is a material which allows an aerogel to contain silica, and may be one or more selected from the group consisting of tetra methyl ortho silicate (TMOS), tetra ethyl ortho silicate (TEOS), methyl triethyl ortho silicate, dimethyl diethyl ortho silicate, tetra propyl ortho silicate, tetra isopropyl ortho silicate, tetra butyl ortho silicate, tetra secondary butyl ortho silicate, tetra tertiarybutyl ortho silicate, tetra hexyl ortho silicate, tetra cyclohexyl ortho silicate, and tetra dodecyl ortho silicate, and in addition, a pre-hydrolysate of the above compounds may be used. When a pre-hydrolysate is used, the addition of an acid is not required, the process of hydrolyzing a silica precursor may be shortened or omitted, and a surface modification effect may be promoted.

According to an embodiment of the present invention, the silica precursor may be a pre-hydrolyzed tetra ethyl ortho silicate (HTEOS), and here, the pre-hydrolyzed tetra ethyl ortho silicate is a pre-hydrolyzed ethyl polysilicate oligomer material having a wide molecular weight distribution, which may be easily applied according to user's reaction conditions since physical properties such as gelation time may be adjusted when synthesized into an oligomer form from a tetra ethyl ortho silicate monomer by varying the degree of prehydrolysis (the degree of hydration), and which has excellent reproducibility of a final product, so that there is an effect of maintaining a uniform quality.

According to an embodiment of the present invention, the organic solvent of the step (S1) may be the same as the organic solvent described above.

According to an embodiment of the present invention, the step (S1) may be performed by mixing the silica precursor and the organic solvent in a weight ratio of 1.0:0.1 to 10.0, 1.0:0.5 to 5.0, 1.0:1.0 to 3.0, or 1.0:1.0 to 1.5.

According to an embodiment of the present invention, the step (S2) is a step of preparing a catalyst composition for inducing gelation from the precursor composition prepared in the step (S1), and may be performed by mixing an organic solvent, a catalyst, and a surface modifier.

According to an embodiment of the present invention, the organic solvent of the step (S2) may be the same as the organic solvent described above, and as a specific example, may be the same as the organic solvent in the step (S1).

According to an embodiment of the present invention, the catalyst may be a base catalyst, and as a specific example, may be an inorganic base such as sodium hydroxide, potassium hydroxide, and the like, or an organic base such as ammonium hydroxide, as a material which allows a pH condition to be formed so that the gelation of the silica precursor is induced.

Specifically, the organic base may be one or more selected from the group consisting of ammonium hydroxide ($NH_4OH$), tetramethylammonium hydroxide (TMAH), tetraethyl ammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino)ethanol, 2-(methylamino)ethanol, N-methyldiethanolamine, dimethylaminoethanol, diethylaminoethanol, nitrilotriethanol, 2-(2-aminoethoxy)ethanol, 1-amino-2-propanol, triethanolamine, monopropanolamine, and dibutanolamine.

According to an embodiment of the present invention, the surface modifier included in the catalyst composition may be an alkyl silane compound, and as a specific example, may be one or more selected from the group consisting of trimethylethoxysilane (TMES), trimethylsilanol (TMS), trimethylchlorosilane (TMCS), methyltrimethoxysilane (MTMS), methyltriethoxysilane (MTES), dimethyldiethoxysilane (DMDEOS), ethyltriethoxysilane, and phenyltriethoxysilane.

According to an embodiment of the present invention, by including the surface modifier in the catalyst composition, the surface modifier may participate in a gelation reaction as a co-precursor, and may hydrophobize a formed silica wet gel blanket. Since the alkyl silane compound may be gelled with the silica precursor in a gelation step. In addition, the alkyl silane compound may be entrapped in a gel, and at this time, the alkyl silane compound may form an alkyl-Si—O—Si networking in aging and surface modification steps to hydrophobize a silica wet gel blanket.

According to an embodiment of the present invention, the step (S2) may be performed by mixing the organic solvent, the catalyst, and the surface modifier in a weight ratio of 1.000:0.001 to 0.100:0.010 to 1.000, 1.00:0.01 to 0.08:0.01 to 0.50, or 1.00:0.02 to 0.06:0.05 to 0.30.

According to an embodiment of the present invention, the step (S3) is a step of impregnating a base material for a blanket with a silica sol and preparing a wet gel blanket through gelation, and may be performed by including steps of introducing the precursor composition and the catalyst composition into an impregnation tank to prepare a silica sol, allowing a base material for a blanket to pass through the impregnation tank to impregnate the base material for a blanket with the silica sol, and performing gelation.

According to an embodiment of the present invention, the silica sol prepared by mixing the precursor composition and the catalyst composition may be subjected to gelation by itself, and at this time, the gelation may be achieved as a base material for a blanket is impregnated with the silica sol while the base material for a blanket is passing through the impregnation tank. That is, the wet gel blanket prepared in the step (S3) may be a wet gel blanket in which the precursor composition and the catalyst composition are impregnated and gelled in the base material for a blanket when the base material for a blanket passes through the impregnation tank.

According to an embodiment of the present invention, when a base material for a blanket passes through the impregnation tank in the step (S3), the temperature of the silica sol may be room temperature ($23\pm5°$ C.) to $50°$ C., room temperature to $40°$ C., or room temperature to $35°$ C., and within this range, there is an effect in that the gelation stably progresses.

According to an embodiment of the present invention, the gelation in the step (S3) may be performed for 5 minutes to 1 hour, 5 minutes to 30 minutes, or 10 minutes to 20 minutes, and within this range, there is an effect in that the gelation may be sufficiently induced.

According to an embodiment of the present invention, the base material for a blanket may be appropriated selected according to the use thereof, and as a specific example, may be an inorganic fiber or an organic fiber. As a more specific example, the base material for a blanket may be a film, a sheet, a net, a fiber, a porous body, a foam, a non-woven body, or a laminate of two or more layers thereof, and may have surface roughness formed or patterned on the surface thereof if necessary. The base material for a blanket may be a fiber capable of further improving thermal insulation performance due to an aerogel formed from a silica sol by including a space or a void through which the silica sol may be easily inserted into the base material for a blanket.

According to an embodiment of the present invention, the fiber may be polyethylene terephthalate, polyamide, polybenzimidazole, polyaramid, an acrylic resin, a phenolic resin, polyester, polyetheretherketone (PEEK), polyolefin (a polyethylene, polypropylene, or polyethylene-propylene copolymer, etc.), cellulose, carbon, cotton, wool, hemp, a non-woven fabric, a glass fiber, or ceramic wool, and as a specific example, may be a glass fiber.

According to an embodiment of the present invention, the glass fiber may be a glass fiber needle mat, and at this time, the glass fiber needle mat may have a density of 100 $kg/m^3$ to 150 $kg/m^3$, 110 $kg/m^3$ to 140 $kg/m^3$, or 120 $kg/m^3$ to 140 $kg/m^3$.

According to an embodiment of the present invention, the step (S4) may be a step of adding a surface modification solution including a surface modifier to the wet gel blanket and aging the mixture to manufacture an aerogel blanket whose surface is hydrophobized to improve water repellency performance, and at this time, the aging and the surface modification may be simultaneously performed.

According to an embodiment of the present invention, the surface modification solution may include an organic solvent and a surface modifier, and at this time, the organic solvent may be the same as the organic solvent described above, and as a specific example, may be the same as the organic solvent of the step (Si) and the step (S2).

According to an embodiment of the present invention, the surface modifier of the step (S4) may be an alkyl silane compound, and as a specific example, may be one or more selected from the group consisting of trimethylethoxysilane (TMES), trimethylsilanol (TMS), trimethylchlorosilane (TMCS), methyltrimethoxysilane (MTMS), methyltriethoxysilane (MTES), dimethyldiethoxysilane (DMDEOS), ethyltriethoxysilane, and phenyltriethoxysilane.

According to an embodiment of the present invention, the step (S4) may be performed by mixing the organic solvent and the surface modifier in a weight ratio of 1.00:0.01 to 0.50, 1.0:0.1 to 0.3, or 1.0:0.1 to 0.2.

According to an embodiment of the present invention, the step (S4) may be performed for 1 hour to 10 hours, 2 hours to 8 hours, or 3 hours to 7 hours at $60°$ C. to $100°$ C., $70°$ C. to $90°$ C., or $75°$ C. to $85°$ C., and within this range, there is an effect in that the surface modification may be sufficiently induced.

According to an embodiment of the present invention, the step (S20) is a step of performing supercritical drying to remove the solvent while maintaining the pore structure of the aged silica wet gel, and may be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide. The supercritical carbon dioxide has a molecular density close to that of a liquid, but has a low viscosity, thereby having properties similar to those of a gas, and has a high drying efficiency due to fast diffusion and high thermal conductivity, so that drying process time may be shortened.

According to an embodiment of the present invention, the step (S20) may be performed by including a solvent substitution process of introducing the wet gel blanket into a supercritical drying reactor or a supercritical extractor, which is a supercritical extraction device, filling carbon dioxide in a liquid state, and substituting an organic solvent in the wet gel blanket with the carbon dioxide. In addition, after the solvent substitution process, the step (S20) may be performed by raising the temperature to $40°$ C. to $80°$ C. at a constant temperature raising rate, specifically at a rate of $0.1°$ C./min to $10.0°$ C./min, and then applying a pressure greater than or equal to a pressure at which carbon dioxide becomes supercritical, specifically a pressure of 100 bar to 170 bar, thereby controlling the carbon dioxide to be in a supercritical state. In general, carbon dioxide becomes supercritical at a temperature of $31°$ C. and a pressure of 73.8 bar.

According to an embodiment of the present invention, the drying of the step (S20) may be to dry the wet gel blanket, and at the same time, extract the organic solvent, and as a specific example, the organic solvent may be extracted together with carbon dioxide, and the extracted organic solvent may be recirculated to the step (S10) of preparing a wet gel blanket.

As described above, by drying the wet gel blanket to remove the organic solvent, and at the same time, reusing the organic solvent extracted therefrom, it is possible to reduce an additional amount of organic solvent to be introduced when preparing a wet gel blanket, and accordingly, there is an effect of improving productivity by preventing an increase in manufacturing cost.

According to an embodiment of the present invention, the carbon dioxide used in the step (S20) may be extracted together with the organic solvent, and then the carbon dioxide and the organic solvent may be separated from each other and recovered in order to reuse the organic solvent as described above. At this time, the separation may be performed through a separate separator. In addition, the carbon dioxide used in the step (S20) may be separated from the organic solvent, and then recovered to be used in the step (S20) and/or the step (S40) to be described below. As described above, by reusing the carbon dioxide, it is possible to reduce an additional amount of carbon dioxide to be introduced when drying the wet gel blanket, and accordingly, there is an effect of improving productivity by preventing an increase in manufacturing cost.

According to an embodiment of the present invention, in order to remove all of the organic solvent in the wet gel blanket by supercritical drying, the supercritical drying may be performed for a very long period of time, which consumes a lot of energy to continuously maintain a high pressure and a high temperature for maintaining the carbon dioxide in a supercritical state. Therefore, the drying of the step (S20) may be performed for 100 to 720 minutes, 120 to 360 minutes, or 150 to 180 minutes from the start of the pressurization, and within this range, the organic solvent in a wet gel blanket may be efficiently removed.

According to an embodiment of the present invention, the step (S30) may be a step of decompressing the pressure of the supercritical extraction device to obtain a wet gel blanket or an aerogel blanket after the completion of the supercritical drying of the step (S20).

According to an embodiment of the present invention, most of the organic solvent in the wet gel blanket is removed and extracted by the drying of the step (S20), but some of the organic solvent may remain and cause moisture absorption when the aerogel blanket is used and exposed to moisture, which results in degrading the water repellency performance of the aerogel blanket, causing the thermal conductivity of the aerogel blanket to increase, and causing a problem in that the durability of the aerogel blanket is degraded. Therefore, according to an embodiment of the present invention, the decompression of the step (S30) may be performed such that the pressure of the supercritical extraction device is to be 10 bar to 70 bar, 10 bar to 50 bar, 10 bar to 30 bar, or 15 bar to 25 bar in order to efficiently perform the drying of the step (S40) to be described below. As a specific example, the decompression of the step (S30) may be performed by including performing decompression such that the pressure of the supercritical extraction device is to be 30 bar to 70 bar, 40 bar to 70 bar, or 50 bar to 70 bar (S31), and performing decompression such that the pressure of the supercritical extraction device is to be 10 bar to 50 bar, 10 bar to 40 bar, 10 bar to 30 bar, or 15 bar to 25 bar (S32), and in this case, there is an effect of preventing safety problems which may occur due to a sudden pressure drop.

According to an embodiment of the present invention, the step (S40) is a step of additionally removing and extracting the organic solvent remaining in the wet gel blanket after the drying of the step (S20), and may be performed in the supercritical extraction device.

As described above, typically, in order to additionally remove and extract an organic solvent remaining in a wet gel blanket or an aerogel blanket, an atmospheric pressure drying process is additionally performed after performing supercritical drying on the wet gel blanket as in the step (S20). Here, the atmospheric pressure drying process is performed as a hot air drying process using air having a temperature of 150° C. to 180° C. under atmospheric pressure.

However, the atmospheric pressure drying process additionally performed causes the total drying time to increase when the aerogel blanket is manufactured, and there are problems in that thermal energy is essentially consumed to generate the hot air, and an exhaust gas treatment facility is essentially required to process an exhaust gas generated from the atmospheric pressure drying process.

However, in the case of drying a wet gel blanket by supplying gaseous carbon dioxide to a decompressed supercritical extraction device as in the step (S40) according to an embodiment of the present invention, an atmospheric pressure drying process may be omitted, so that thermal energy consumption for atmospheric pressure drying is reduced to improve productivity while shortening the total drying time, and at the same time, an exhaust gas treatment facility is not required to process an exhaust gas generated from the atmospheric pressure drying process.

According to an embodiment of the present invention, the step (S40) is characterized by supplying gaseous carbon dioxide, not supercritical carbon dioxide as in the step (S20).

At this time, the pressure at which the gaseous carbon dioxide is supplied in the step (S40) may be 10 bar to 70 bar, 10 bar to 50 bar, 10 bar to 30 bar, or 15 bar to 25 bar. That is, the pressure at which the gaseous carbon dioxide is supplied may be the same as the pressure of the supercritical extraction device decompressed in the step (S30). Meanwhile, the pressure of the decompressed supercritical extraction device to which the gaseous carbon dioxide is supplied is not separately pressurized at atmospheric pressure, but is decompressed in accordance with the step (S30) after the completion of the supercritical drying in the supercritical extraction device, so that there is an advantage in that separate pressurization is not required to maintain the pressure of the supercritical extraction device at the above pressure.

According to an embodiment of the present invention, the temperature at which the gaseous carbon dioxide is supplied in the step (S40) may be 60° C. or higher, 60° C. to 120° C., 60° C. to 100° C., 70° C. to 100° C., or 70° C. to 90° C., and within this range, there is an effect of removing and extracting remaining organic solvent to the maximum while minimizing the amount of power of a vapor drying process.

According to an embodiment of the present invention, as in the step (S20), the drying of the step (S40) may be to dry the wet gel blanket, and at the same time, extract the organic solvent, and as a specific example, the organic solvent may be extracted together with carbon dioxide, and the extracted organic solvent may be recirculated to the step (S10) of preparing a wet gel blanket. As described above, by additionally drying the wet gel blanket using gaseous carbon dioxide to remove the organic solvent, and at the same time, reusing the organic solvent extracted therefrom, it is possible to reduce an additional amount of organic solvent to be introduced when preparing a wet gel blanket, and accordingly, there is an effect of improving productivity by preventing an increase in manufacturing cost.

According to an embodiment of the present invention, the carbon dioxide used in the step (S40) may be extracted together with the organic solvent, and then the carbon dioxide and the organic solvent may be separated from each other and recovered in order to reuse the organic solvent as described above. At this time, the separation may be performed through a separate separator. In addition, the carbon dioxide used in the step (S40) may be separated from the organic solvent, and then recovered to be used in the step (S20) and/or the step (S40). As described above, by reusing the carbon dioxide, it is possible to reduce an additional amount of carbon dioxide to be introduced when drying the wet gel blanket, and accordingly, there is an effect of improving productivity by preventing an increase in manufacturing cost.

According to an embodiment of the present invention, the drying of the step (S40) may be performed for 10 to 60 minutes, 20 to 50 minutes, or 25 to 40 minutes from the completion of the decompression of the step (S30), and within this range, the organic solvent in an aerogel blanket may be removed to the maximum.

According to an embodiment of the present invention, the method for manufacturing an aerogel blanket may further include decompressing the pressure of the supercritical extraction device to atmospheric pressure (S50) after the drying of the step (S40). The step (S50) may be a step of obtaining an aerogel blanket from which the organic solvent is removed and extracted.

According to an embodiment of the present invention, the method for manufacturing an aerogel blanket may have a recovery rate of an organic solvent of 98.00 wt % or greater, 98.00 wt % to 100.00 wt %, 98.20 wt % to 99.99 wt %, or 98.23 wt % to 99.57 wt %.

In addition, the present invention provides an aerogel blanket manufactured by the method for manufacturing an aerogel blanket. The aerogel blanket may have uniform thermal conductivity and greatly improved overall thermal insulation due to the uniform thermal conductivity formed in the blanket.

According to an embodiment of the present invention, the aerogel blanket includes a base material for a blanket, and a silica aerogel formed inside and on the surface of the base material for a blanket, and may have a moisture impregnation rate of 0.1 wt % to 5.0 wt %, 1.0 wt % to 4.0 wt %, 2.0 wt % to 3.5 wt %, or 2.6 wt % to 3.4 wt %.

According to an embodiment of the present invention, the aerogel blanket includes a base material for a blanket, and a silica aerogel formed inside and on the surface of the base material for a blanket, and may have a room temperature thermal conductivity of 30.00 mW/mK or less, 10.00 mW/mK to 30.00 mW/mK, 15.00 mW/mK to 20.00 mW/mK, 18.00 mW/mK to 19.00 mW/mK, or 18.09 mW/mK to 18.83 mW/mK.

According to an embodiment of the present invention, the aerogel blanket may be usefully used as a thermal insulation material, a lagging material, or a non-combustible material for aircrafts, ships, automobiles, building structures, and the like, as well as for plant facilities for insulating and cooling, such as piping and industrial furnaces of various industrial facilities.

Hereinafter, embodiments of the present invention will be described in detail so that those skilled in the art may easily carry out the present invention. However, the present invention may be embodied in many different forms, and is not limited to the embodiments set forth herein.

EXAMPLES

Example 1

A pre-hydrolyzed tetra ethyl ortho silicate and ethanol were mixed at a weight ratio of 1:1.1 to prepare a silica precursor composition.

Separately, ethanol, sodium hydroxide as a base catalyst, and trimethylethoxysilane (TMES) as a surface modifier were mixed at a weight ratio of 1:0.046:0.14 to prepare a catalyst composition.

Thereafter, the silica precursor composition and the catalyst composition prepare above were introduced into a 15 L impregnation tank and mixed at a weight ratio of 1:0.941 to prepare a silica sol, and as a base material for a blanket, a glass fiber needle mat (density of 130 kg/m$^3$) was allowed to pass through the impregnation tank to be impregnated while maintaining the temperature of the silica sol at room temperature (23±5° C.), and then gelled to manufacture a gelled wet gel blanket. At this time, the gelation was completed between 10 minutes to 20 minutes.

To the gelled wet gel blanket, a surface modification solution in which ethanol and trimethylethoxysilane (TMES), which was a surface modifier, were mixed at a weight ratio of 1:0.128 was added, and then aged for 5 hours at 75° C. to manufacture a wet gel blanket including ethanol.

Thereafter, the wet gel blanket including ethanol manufactured above was put into a 70 L supercritical extractor, and carbon dioxide was injected thereto. Next, the temperature of the supercritical extractor was raised to 80° C. over the course of 15 minutes, and pressure was applied to 170 bar to control the carbon dioxide to be in a supercritical state, and thereafter, supercritical drying was performed on the wet gel blanket including ethanol. At this time, the drying was performed for 165 minutes from the start of the pressurization, and ethanol extracted together with the supercritical carbon dioxide was recovered through a separator.

After the supercritical drying was completed, decompression was performed for 15 minutes to decompress the pressure of the supercritical extractor to 60 bar, and thereafter, additional decompression was performed for 15 minutes to decompress the pressure of the supercritical extractor to 20 bar.

To the supercritical extractor whose pressure was decompressed to 20 bar, gaseous carbon dioxide having a temperature of 80° C. was supplied and circulated to perform vapor drying for the wet gel blanket having residual ethanol.

At this time, the drying was performed for 30 minutes from the completion of the decompression, and ethanol extracted together with the gaseous carbon dioxide was recovered through a separator.

After the completion of the vapor drying, decompression was performed for 15 minutes to decompress the pressure of the supercritical extractor to atmospheric pressure, and a dried aerogel blanket was obtained.

Example 2

The same was performed in the same manner as in Example 1 except that in Example 1, when allowing the glass fiber needle mat, as a base material for a blanket, to pass through the impregnation tank to be impregnated, the temperature of the silica sol was raised to 35° C. and then maintained, instead of being maintained at room temperature.

Example 3

The same was performed in the same manner as in Example 1 except that in Example 1, when preparing the wet gel blanket including ethanol, a surface modification solution was added and aged for 5 hours at 85° C., instead of 75° C.

COMPARATIVE EXAMPLES 1 TO 3

The same was performed in the same manner as in Example 1 except that a drying process was performed as follows on the wet gel blanket including ethanol manufactured in Example 1.

The wet gel blanket including ethanol manufactured in Example 1 was put into a 70 L supercritical extractor, and carbon dioxide was injected thereto. Next, the temperature of the supercritical extractor was raised to 80° C. over the course of 15 minutes, and pressure was applied to 170 bar to control the carbon dioxide to be in a supercritical state, and thereafter, supercritical drying was performed on the wet gel blanket including ethanol. At this time, the drying was performed for 165 minutes from the start of the pressurization, and ethanol extracted together with the supercritical carbon dioxide was recovered through a separator.

After the supercritical drying was completed, decompression was performed for 15 minutes to decompress the pressure of the supercritical extractor to 60 bar, and thereafter, additional decompression was performed for 25 minutes to decompress the pressure of the supercritical extractor to atmospheric pressure, thereby obtaining a supercritically dried wet gel blanket having residual ethanol.

The obtained wet gel blanket having residual ethanol was placed into a dryer, and atmospheric pressure drying was performed using hot air using air having a temperature of 180° C. at atmospheric pressure. At this time, the atmospheric pressure drying was performed for 50 minutes, and an exhaust gas generated from the atmospheric pressure drying was discharged using a separate exhaust gas processing device.

After the completion of the atmospheric pressure drying, a dried aerogel blanket was obtained.

COMPARATIVE EXAMPLES 2 TO 3

In order to confirm reproducibility under the same conditions with respect to Comparative Example 1, the same was performed respectively in the same manner as in Comparative Example 1.

COMPARATIVE EXAMPLE 4

The same was performed in the same manner as in Comparative Example 1 except that in Comparative Example 1, an aerogel blanket was obtained as a supercritically dried wet gel blanket without performing atmospheric pressure drying.

EXPERIMENTAL EXAMPLES

The total drying time according to the drying processes of Examples 1 to 3 and Comparative Examples 1 to 4, the recovery rate of ethanol, the amount of power consumed in a vapor drying process or atmospheric pressure drying process, the moisture impregnation rate and room temperature thermal conductivity of a prepared aerogel blanket were measured in the following manners, and are shown in Tables 1 and 2.

Total drying time: After the wet gel blanket was placed into the supercritical extractor, the total time consumed for pressurization, drying, and decompression was summed based on the time at which the pressurization was started.

Recovery rate of ethanol (wt %): When the aerogel blanket was manufactured, the content of ethanol recovered through a drying process with respect to the content of the total ethanol introduced as a solvent was calculated and shown as a percentage.

Amount of power consumed in vapor drying process or atmospheric pressure drying process ($kWh/m^2$): For 1 roll (4 $m^2$) of the wet gel blanket, the amount of power consumed during the vapor drying process of Examples and the amount of power consumed during the atmospheric drying process of Comparative Examples were measured and shown.

Moisture impregnation rate (wt %): For the aerogel blanket manufactured in each of Examples and Comparative Examples, three specimens (thickness of less than 100 mm) having a size of 254 mm×254 mm were prepared, and the specimens were floated on distilled water of 21±2° C., and a 6.4 mm mesh screen was placed on the specimens to impregnate the specimens by sinking the same to 127 mm below the surface of the water. 15 minutes later, the mesh screen was removed, and when the specimens rose to the surface, the specimens were picked up with a clamp and were hung vertically for 60±5 seconds. Thereafter, the weight before and after the impregnation were each measured to determine a weight increase rate, and an average value for the three specimens is shown as a moisture impregnation rate.

Room temperature thermal conductivity (mW/mK): A specimen having a size of 30 cm×30 cm was prepared from the aerogel blanket manufactured in each of Examples and Comparative Examples, and the room temperature (23±5° C.) thermal conductivity of the specimen was measured using the HEM 436 Lambda equipment of NETZSCH Co., Ltd.

TABLE 1

| Classifications | | Examples | | |
|---|---|---|---|---|
| | | 1 | 2 | 3 |
| Total drying time | (min) | 255 | 255 | 255 |
| Recovery rate of ethanol | (wt %) | 98.23 | 99.57 | 98.28 |
| Amount of power of vapor drying process | ($kWh/m^2$) | 5.21 | 5.21 | 5.21 |
| Amount of power of atmospheric pressure drying process | ($kWh/m^2$) | — | — | — |
| Moisture impregnation rate | (wt %) | 3.40 | 2.60 | 2.70 |
| Room temperature thermal conductivity | (mW/mK) | 18.82 | 18.83 | 18.09 |

TABLE 2

| Classifications | | Comparative Examples | | | |
|---|---|---|---|---|---|
| | | 1 | 2 | 3 | 4 |
| Total drying time | (min) | 270 | 270 | 270 | 220 |
| Recovery rate of ethanol | (wt %) | 97.63 | 97.27 | 97.08 | 98.04 |
| Amount of power of vapor drying process | ($kWh/m^2$) | — | — | — | — |
| Amount of power of atmospheric pressure drying process | ($kWh/m^2$) | 22.00 | 22.31 | 18.20 | — |
| Moisture impregnation rate | (wt %) | 3.20 | 1.30 | 2.50 | 8.07 |
| Room temperature thermal conductivity | (mW/mK) | 18.27 | 18.09 | 17.25 | 18.07 |

As shown in Tables 1 and 2, in the case of Examples 1 to 3 in which the drying process was performed according to the method for manufacturing an aerogel blanket of the present invention, when compared to Comparative Examples 1 to 3 in which a separate atmospheric pressure drying process was performed after supercritical drying, the total drying time was shortened by 15 minutes (5.6%) while the same level of moisture impregnation rate and room temperature thermal conductivity were implemented, and the recovery rate of ethanol was improved, and in particular, compared to the average amount of power of 20.84 $kWh/m^2$ consumed during the atmospheric pressure drying process of Comparative Examples 1 to 3, only the amount of power of 5.21 kWh/m² was consumed during the vapor drying process, so that it was confirmed that the amount of power consumption was reduced.

Meanwhile, in the case of Comparative Example 4 in which a separate atmospheric pressure process or vapor drying process was not performed after supercritical drying, the total drying time was the shortest, but the supercritically dried wet gel blanket was immediately obtained as an aerogel blanket, so that ethanol remained in the aerogel blanket, and accordingly, when moisture penetrated, the moisture was absorbed by the ethanol, so that it was confirmed that water repellency performance was degraded due to an increase in moisture impregnation rate.

From the above results, it was confirmed that when in accordance with the method for manufacturing an aerogel blanket according to the present invention, the amount of residual organic solvent of an aerogel blanket may minimized after drying, so that the degradation of physical properties caused by the residual organic solvent may be prevented, an organic solvent may be recovered to the maximum, so that productivity may be improved by reducing the manufacturing cost of the aerogel blanket, and an atmospheric pressure drying process may be omitted, so that thermal energy consumption for atmospheric pressure drying is reduced to improve productivity while shortening the total drying time, and at the same time, an exhaust gas treatment facility is not required to process an exhaust gas generated from the atmospheric pressure drying process.

The invention claimed is:

1. A method for manufacturing an aerogel blanket, the method comprising:
   preparing a wet gel blanket including an organic solvent;
   introducing the wet gel blanket into a supercritical extraction device, and drying the wet gel blanket using supercritical carbon dioxide;
   decompressing the supercritical extraction device; and
   supplying gaseous carbon dioxide to the decompressed supercritical extraction device to dry the wet gel blanket,
   wherein in the supplying of the gaseous carbon dioxide, a temperature at which the gaseous carbon dioxide is supplied is 60° C. or higher.

2. The method of claim 1, wherein the organic solvent is an alcohol.

3. The method of claim 1, wherein in the preparing of the wet gel blanket, the wet gel blanket is a silica wet gel blanket.

4. The method of claim 1, wherein the preparing of the wet gel blanket comprises:
   preparing a precursor composition including a silica precursor and the organic solvent;
   preparing a catalyst composition including the organic solvent, a catalyst, and a surface modifier;
   introducing the precursor composition and the catalyst composition into an impregnation tank, and allowing a base material for a blanket to pass through the impregnation tank to prepare the wet gel blanket; and
   adding a surface modification solution including a surface modifier to the wet gel blanket and aging the mixture.

5. The method of claim 4, wherein in the allowing the base material for the blanket to pass through the impregnation tank, the wet gel blanket is a wet gel blanket in which the precursor composition and the catalyst composition are impregnated and gelled in the base material for the blanket when the base material for the blanket passes through the impregnation tank.

6. The method of claim 1, wherein the drying of the wet gel blanket using the supercritical carbon dioxide includes drying the wet gel blanket, and at the same time, extracting the organic solvent.

7. The method of claim 6, wherein the extracted organic solvent is recirculated to the preparing of the wet gel blanket.

8. The method of claim 1, wherein the decompressing of the supercritical extraction device is performed such that a pressure of the supercritical extraction device is to be between 10 bar to 70 bar following the decompressing of the supercritical extraction device.

9. The method of claim 1, wherein the decompressing of the supercritical extraction device comprises performing a first decompression such that a pressure of the supercritical extraction device is to be 50 bar to 70 bar following a first decompressing of the supercritical extraction device; and performing a second decompression such that the pressure of the supercritical extraction device is to be between 10 bar to 50 bar following a second decompressing of the supercritical extraction device.

10. The method of claim 1, wherein in the supplying of the gaseous carbon dioxide, a pressure at which the gaseous carbon dioxide is supplied is 10 bar to 70 bar.

11. The method of claim 1, wherein the supplying of the gaseous carbon dioxide includes drying the wet gel blanket, and at the same time, extracting the organic solvent.

12. The method of claim 11, wherein the extracted organic solvent is recirculated to the preparing of the wet gel blanket.

13. The method of claim 1, further comprising decompressing the supercritical extraction device to atmospheric pressure after the supplying of the gaseous carbon dioxide.

14. The method of claim 1, wherein a recovery rate of the organic solvent extracted in the method for manufacturing an aerogel blanket is 98.00 wt % or greater.

* * * * *